United States Patent [19]
Jama et al.

[11] Patent Number: 5,950,694
[45] Date of Patent: Sep. 14, 1999

[54] APPARATUS FOR DISPENSING PARTICULATE MATERIAL

[75] Inventors: Omar M. Jama; Sergey V. Gurevich, both of Chicago; Michael Z. Mikulicz, Inverness, all of Ill.

[73] Assignee: UOP LLC, Des Plaines, Ill.

[21] Appl. No.: 09/034,688

[22] Filed: Mar. 4, 1998

[51] Int. Cl.$^6$ ........................................... B65B 1/04
[52] U.S. Cl. ........................... 141/286; 141/285; 239/689
[58] Field of Search ............... 141/10, 11, 255, 141/267, 268, 285, 286; 239/689

[56] References Cited

U.S. PATENT DOCUMENTS

| | | | |
|---|---|---|---|
| 2,726,089 | 11/1955 | Baker | 239/689 |
| 3,285,438 | 11/1966 | Howell et al. | 214/17 |
| 3,995,753 | 12/1976 | Millar et al. | 214/17 |
| 4,300,725 | 11/1981 | Moherek | 239/684 |
| 4,424,837 | 1/1984 | Farrell | 141/286 |
| 4,433,707 | 2/1984 | Farnham | 141/286 |
| 4,611,968 | 9/1986 | Dixon et al. | 239/689 |
| 4,972,884 | 11/1990 | Souers et al. | 141/286 |
| 5,209,607 | 5/1993 | Wei et al. | 406/66 |
| 5,558,484 | 9/1996 | Mikulicz et al. | 414/301 |
| 5,687,780 | 11/1997 | Minami | 141/286 |
| 5,731,994 | 3/1998 | Okubo et al. | 141/286 |

FOREIGN PATENT DOCUMENTS

| | | | |
|---|---|---|---|
| 58-6844 | 1/1983 | Japan | B65G 69/04 |

*Primary Examiner*—Henry J. Recla
*Assistant Examiner*—Khoa D. Huynh
*Attorney, Agent, or Firm*—Thomas K. McBride; John G. Tolomei; John G. Cutts, Jr.

[57] ABSTRACT

A dispensing apparatus for particulate matter which distributes the particulate matter, at substantially the same rate, uniformly across a given area of a vessel and comprises a particle container having an opening at one end for receiving particulate material into an upwardly directed end and an outlet end at an opposite end for flowing particulate material. A rotor having multiple elongated, hollow arms, an opening at one end for receiving particulate material from the particle container, the multiple arms each having at least one aperture located in a lower portion thereof for discharging particulate material, wherein the rotor is rotatably positioned below and adjacent to the outlet end of the particle container to permit the flow of particulate material from the particle container to the rotor. A baffle plate having multiple elongated leaves, rotatably positioned around a vertical central axis of the rotor and having dimensions capable of reducing the flow of particulate material from the rotor apertures is located in close proximity to each of the apertures of the rotor. A fastening member is provided on the rotor for releasably fastening the baffle plate to the rotor. A rotating member is also provided for rotating the rotor in communication with the particle container in order to evenly distribute particulate matter on a bed below.

11 Claims, 4 Drawing Sheets

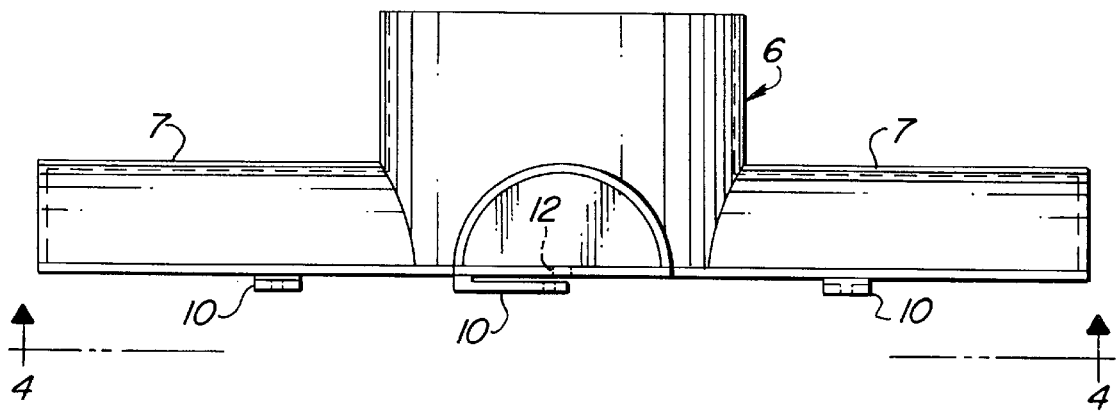
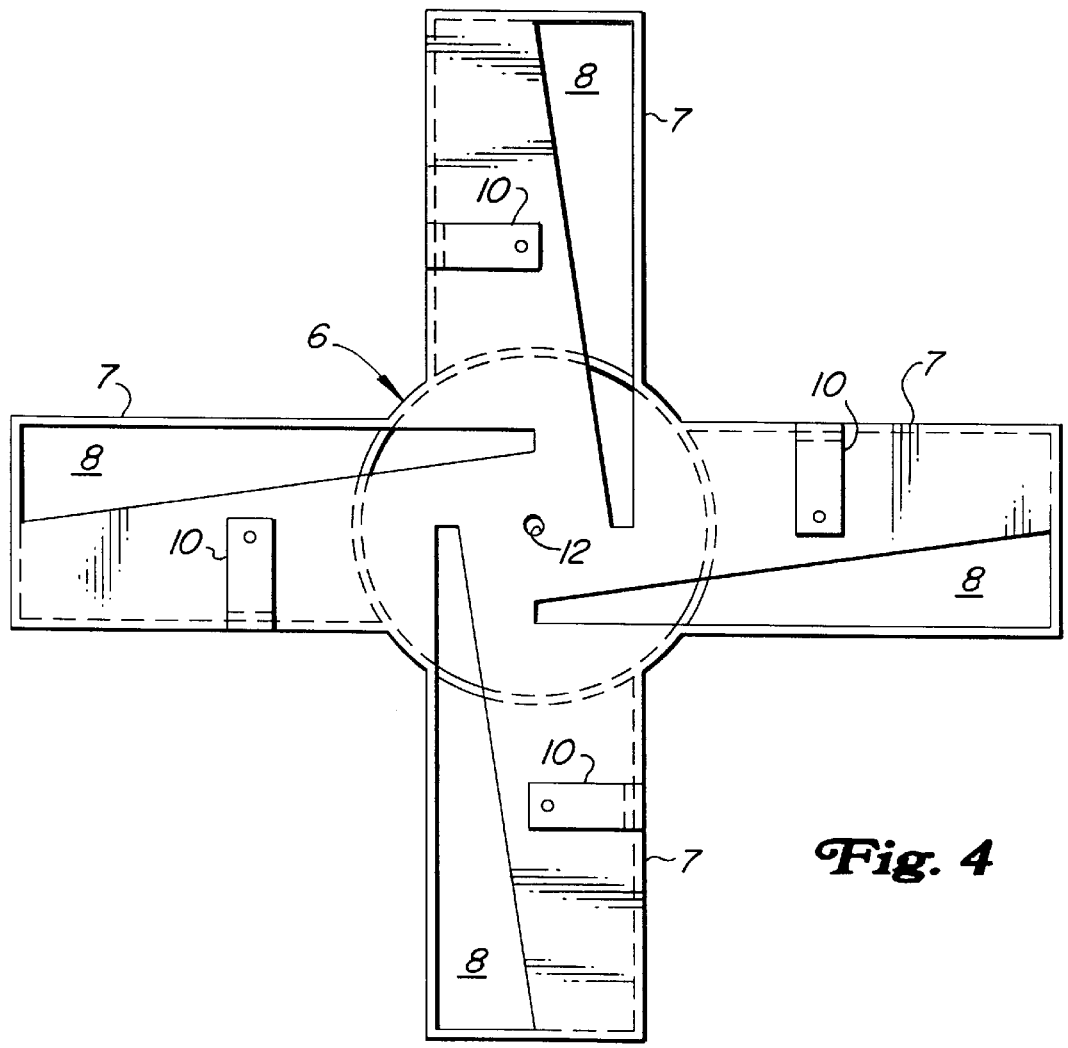

APPARATUS FOR DISPENSING PARTICULATE MATERIAL

FIELD OF THE INVENTION

The invention relates to an improved dispensing apparatus which is capable of distributing particulate matter uniformly across a given cross-sectional area in a facile manner. More particularly, this invention relates to an apparatus which is useful for loading particulate material including catalyst particles in a reactor vessel which results in a high density, uniform catalyst bed.

BACKGROUND OF THE INVENTION

In the past, particulate matter has been loaded into vessels or dispensed by what is commonly referred to as the "sock" method wherein a hopper having an attached hose extends to the bottom of the vessel or to the surface of the previously dispensed particulate matter. The hopper and hose are filled with particulate matter and the particulates are released at the bottom of the hose by slowly raising the hose to thereby permit the particulate matter to flow through the hose onto the top surface of the previously-deposited particulates. The resulting dispensed particulates are in the shape of a cone which can be subsequently distributed over the entire given area by raking.

More recently a variety of apparatus have been utilized to distribute particulate matter in vessels. Although many of these apparatus have achieved an improved method of loading particulate matter compared with the sock method, the known apparatus are difficult to adjust in order to enable the rotating distributors to be configured to produce the desired result with a minimum amount of adjustment and reduced effort on behalf of the operator of the apparatus.

One type of vessel which must be loaded with particulate material is a catalyst reaction vessel. Commercial catalytic reaction zone vessels or reactors vary in width or diameter from about 1 foot to about 15 feet or more, having a length from about 5 feet to about 70 feet or more and have previously been loaded by the method and apparatus described briefly hereinabove. One of the problems associated with the sock method of loading reactors is that the catalyst bed can contain excessive voids which can, during the use of the catalyst, bring about catalyst settling problems or "slumping", localized hot spots during the exothermic reactions of reactants and the necessity to utilize increased reactor volume. In addition, the sock technique requires increased times for loading a reactor since the hose through which the catalyst enters the reactor has to be continually adjusted upwardly in order to allow catalyst to flow into the vessel. In addition to the above method, catalyst can be continually added through a hopper suspended above the catalyst surface which also results in the formation of a cone-shaped pile of catalyst on the top of the catalyst bed. As in the above method, the catalyst cone can be distributed over the catalyst bed by raking.

The resulting settling of the catalyst can change the overall volume of the catalyst bed thereby producing damage to the equipment such as thermowells which have been inserted into the reactor for temperature measurements. In addition, the settling of catalyst can reduce the surface of the catalyst bed to a level whereby the thermowell is not in contact with the catalyst, thereby not allowing the reaction temperature to be monitored during the course of a reaction. Excessive voids in a sock-loaded, or otherwise inefficiently loaded, catalyst bed cause poor gas, liquid or gas-liquid distribution through the bed. The maldistribution often requires decreased throughput or increased temperatures, since the resulting catalyst utilization is low and product specifications may not be met. Settling problems associated with sock-loaded beds may result in damage to other reactor intervals, such as baskets, redistribution trays, catalyst supports and quench spargers.

An additional problem associated with the previous loading techniques is that for a given reactor volume the amount of catalyst which can be charged is determined by the final catalyst density. Thus, a means for increasing the bulk density of catalyst present in a reaction zone would allow for increased throughput of reactants at the same severity or the same throughput at lower severity. Thus, more severe reaction conditions and/or increased throughput can be obtained for a given reaction zone volume if an increase in bulk density of the catalyst can be achieved.

Subsequently, those skilled in the art have used various dispensing apparatus which have demonstrated improved loading of particulates into reactor vessels. These prior art loading devices performed reasonably well, however, a loading device must necessarily be adjusted for each particular vessel in order to assure optimum results. Previous loading apparatus had to be adjusted by trial and error in an attempt to achieve maximum results and this continuous initial adjustment was difficult to perform since the apparatus is generally inserted into the top of the vessel to be filled with particulate matter and is not easily adjustable.

Therefore, those skilled in the art have continuously searched for improved methods which provide a convenient and foolproof method of adjusting the particulate matter rotors in order to rapidly and easily perform the initial adjustment of the catalyst loading device which may be subsequently used during the filling of the vessel. In accordance with the process of the present invention, an apparatus has been devised which produces a densely and evenly loaded bed of particulate matter in a rapid and facile manner.

INFORMATION DISCLOSURE

U.S. Pat. No. 3,995,753 (Millar et al) discloses an apparatus for dispensing particulate matter into a vessel. This apparatus is primarily used in an upper or top portion of the vessel and supported by a man-way.

U.S. Pat. No. 5,209,607 (Wei et al) discloses an apparatus and process for feeding powder or dry solid catalyst into a flowing liquid stream. The apparatus includes a purging device for isolating a metering means from a liquid stream and process for injecting finely divided flowable powder or catalyst into a flowing liquid stream which in turn is fed into a reactor utilized for the production of polypropylene or polyolefins.

Japanese Publication 58-4844(A) discloses an apparatus for stacking grain in a bin by introducing the grain in a center pipe which serves as a container to supply grain to a rotating element having blades which direct the grain in a downwardly oblique direction through upper and lower skirts which are fastened to the rotating element. The grain is also directed downwardly in a vertical direction through a tubular aperture or pipe which is centrally located on the bottom of the rotating element. This apparatus is used to store grain in a vessel while achieving an uneven top surface of the stored grain. The downwardly oblique flow of grain results in an annular accumulation of grain whereby the grain is required to roll downhill to ultimately fill the vessel. The centrally vertical flow of grain produces another pile of grain whereby the grain is also required to roll downhill. The apparatus fails to achieve the distribution of particulate matter uniformly across a given cross-sectional area to thereby achieve a densely and evenly loaded bed of particulate matter.

U.S. Pat. No. 4,300,725 (Moherek) discloses an apparatus for the distribution of material comprising a rotatable, vertically oriented, hollow delivery tube mounted for rotation about a vertical axis within a fixed housing and driven by means of a motor external of the tube. At its upper end, the tube has an inlet port for receiving particulate material and carrying it for distribution from its lower end by an integral system which includes apertures located in the tube's vertical walls and a deflection member or paddle at the base of the tube for radially impelling the material out of the tube through the apertures. The apparatus requires the use of a driving means because the structure of a flat horizontal plate in conjunction with vertical paddles would not otherwise operate to give a uniform, controlled distribution.

U.S. Pat. No. 3,285,438 (Howell et al) discloses an apparatus for achieving uniformity of distribution of solid particles. This apparatus uses vertically and horizontally oriented wheel assemblies to support and rotate a spreader.

U.S. Pat. No. 5,555,484 (Mikulicz et al) discloses an apparatus for dispensing particulate matter which apparatus is attached to a generally vertical support member.

U.S. Pat. No. 5,687,780 (Minami) discloses an apparatus and method for feeding catalyst to a vessel.

SUMMARY OF THE INVENTION

The present invention is an apparatus which is located in a vessel to be loaded with a particulate material. The invention facilitates adjustment by joining a plurality of extended leaves about a central pivot point to provide synchronized control of all arm aperture areas and simultaneous locking of uniform aperture sizing with one or more simple latches or clamps. Therefore, there is no need to remove the apparatus from the vessel for adjustment of flow rates. The apparatus serves as a container for particulate material while the particulate material flows downwardly into a rotor having a multiplicity of elongated hollow arms from which the particulate material flows and is dispensed to a bed located below the apparatus.

A preferred embodiment of the present invention is an apparatus for dispensing particulate material which apparatus comprises a particle container having an opening at one end for receiving particulate material into an upwardly directed end and an outlet end at an opposite end for flowing particulate material. A rotor having multiple elongated, hollow arms, an opening at one end for receiving particulate material from the particle container, the multiple arms each having at least one aperture located in a lower portion thereof for discharging particulate material, wherein the rotor is rotatably positioned below and adjacent to the outlet end of the particle container to permit the flow of particulate material from the particle container to the rotor. A baffle plate having multiple elongated leaves, rotatably positioned around a vertical central axis of the rotor and having dimensions capable of reducing the flow of particulate material from the rotor apertures is located in close proximity to each of the apertures of the rotor. A fastening means is provided on the rotor for releasably fastening the baffle plate to the rotor. A rotating means is also provided for rotating the rotor in communication with the particle container in order to evenly distribute particulate matter on a bed below.

It is therefore an object of the present invention to provide an apparatus and process for loading particulate material into a vessel to produce a bed of particulate material which possesses a high apparent bulk density (ABD). The use of the present invention is particularly advantageous for loading reactor vessels with particulate catalyst.

Another embodiment of the present invention is a method for loading particulate material into a vessel and distributing the particulate material at substantially the same rate, uniformly across the area of the vessel by means of a dispensing apparatus comprising: (a) introducing the particulate material into a particle container of the dispensing apparatus through an inlet opening at an upwardly directed end; (b) flowing particulate material from an outlet end of the particle container through an outlet opening into a particle feed opening of a rotor having multiple elongated, hollow arms; (c) passing particulate material through the hollow interior of the multiple arms and through at least one aperture located in a lower portion of each arm to discharge and distribute particulate material as the rotor rotates relative to the particle container; and (d) controlling the flow of particulate material from the multiple arms by unitary pivotal positioning of a baffle plate and multiple elongated leaves attached thereto relative to the rotor and selective engagement of a fastener that fixes the leaves in variable occluding positions with respect to each of the apertures of the rotor.

BRIEF DESCRIPTION OF THE DRAWINGS

FIG. 3 is a side view of the rotor.

FIG. 4 is a plan view of the rotor.

DETAILED DESCRIPTION OF THE INVENTION

Figure 1:
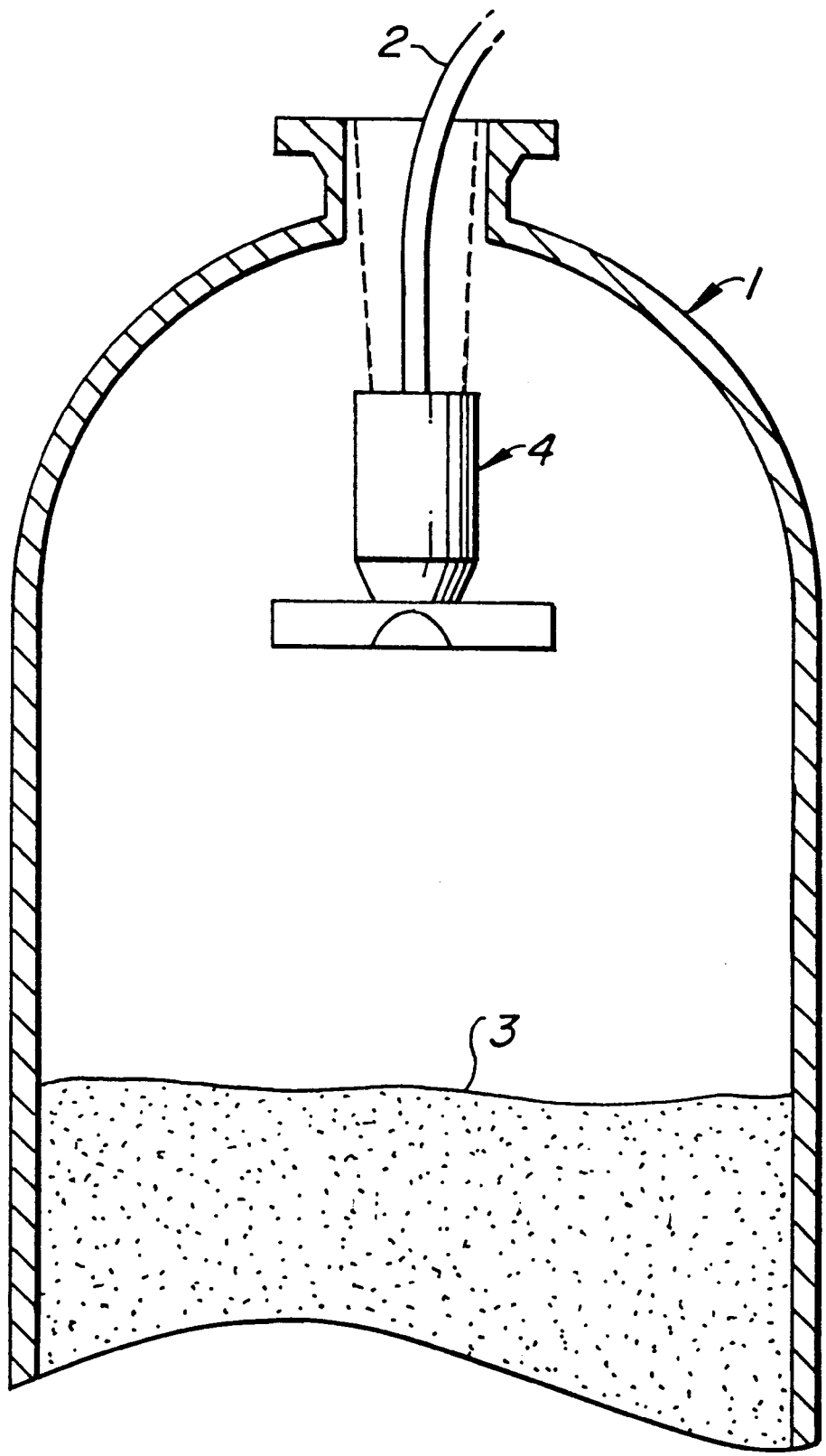
FIG. 1 is a schematic view of a vessel and the particulate dispensing apparatus.
Figure 2:
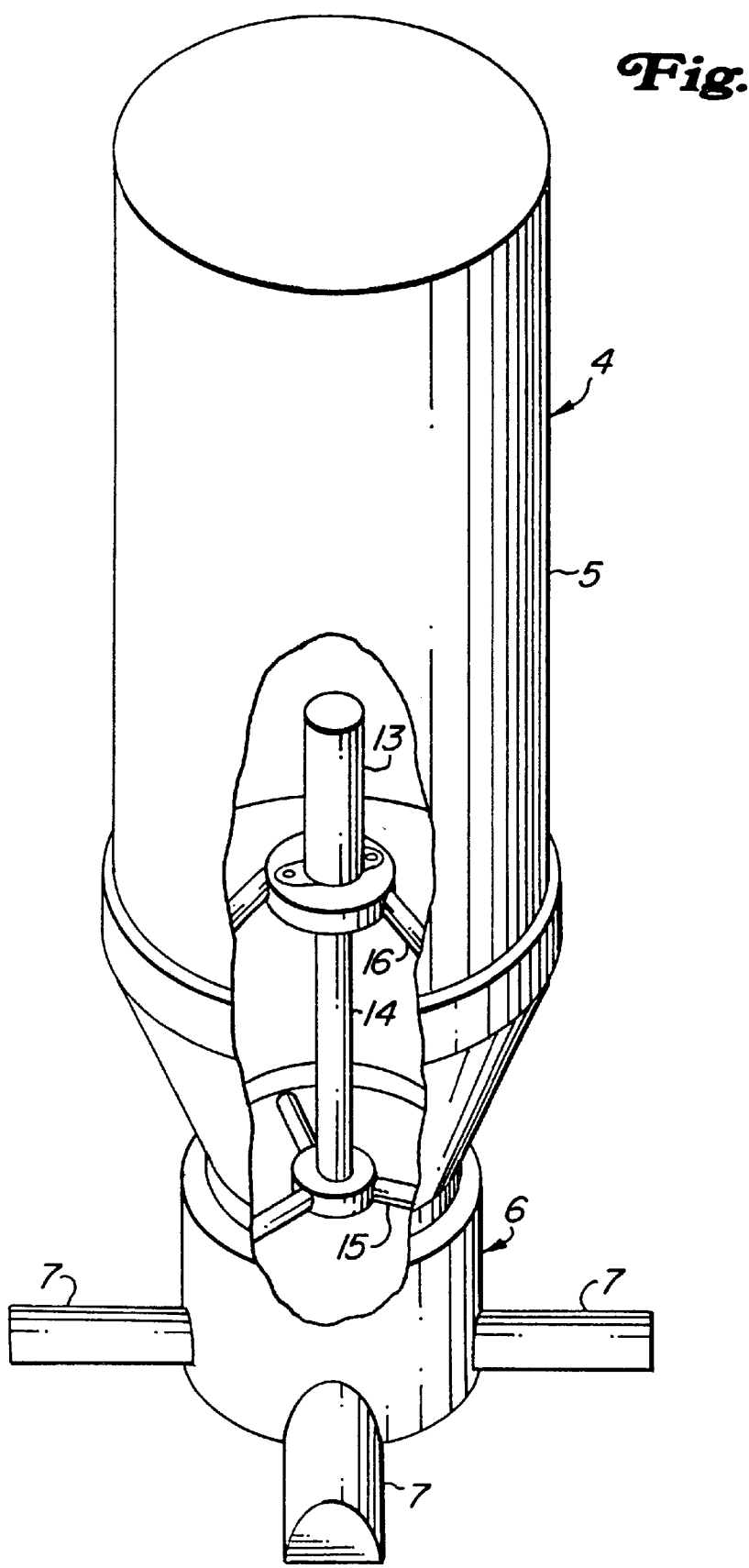
FIG. 2 is a cutaway isometric of the particulate dispensing apparatus.
Figure 5:
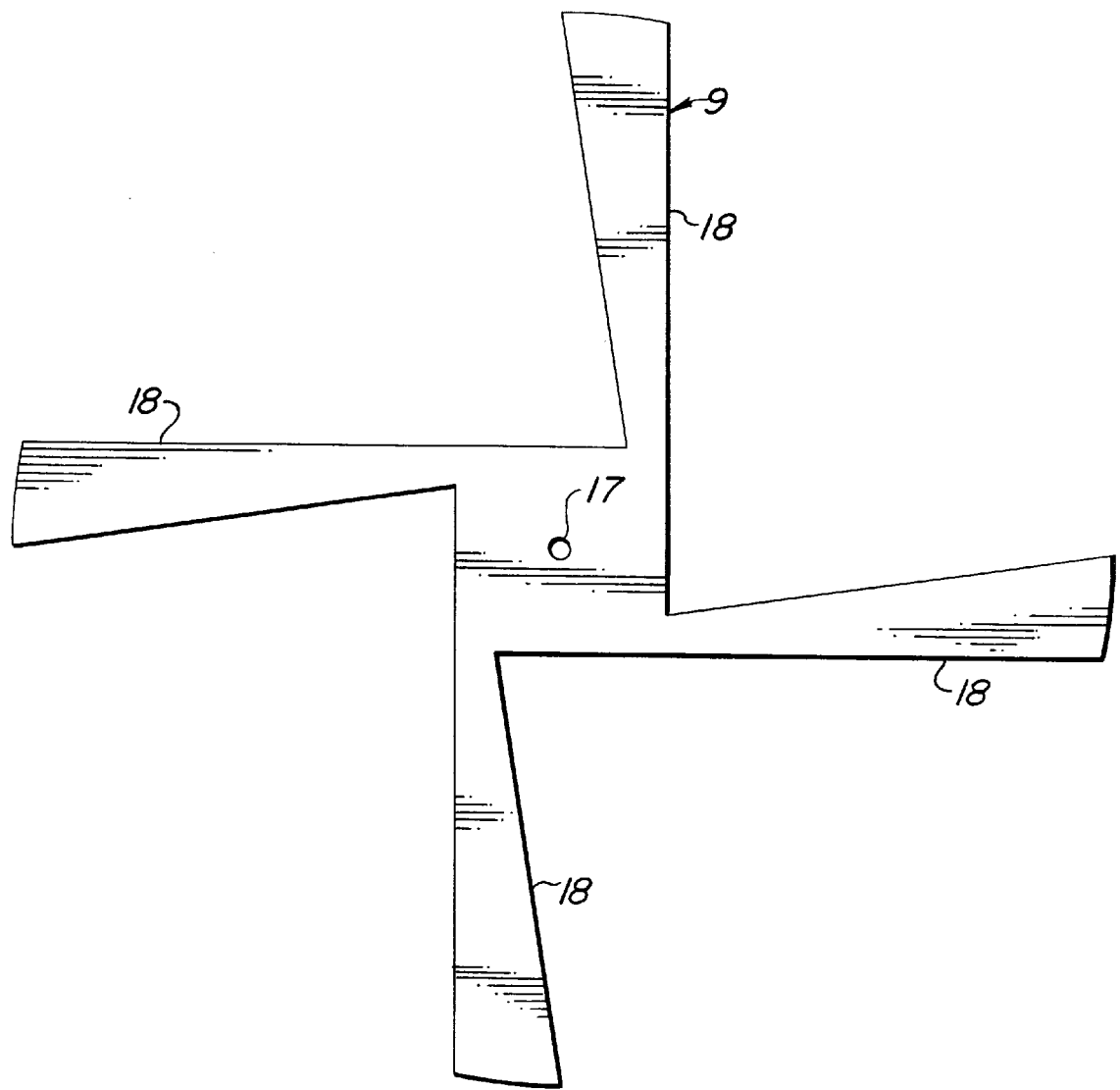
FIG. 5 is a plan view of the baffle plate.

The present invention may be used to dispense most types of particulate matter which are typically loaded into vessels and any other confined spaces. A particularly advantageous use of the present invention is to load catalyst particles into a reactor vessel.

A particular advantage for the use of catalyst charged with the apparatus of the present invention is in various hydrocarbon conversion processes such as hydrogenation, reforming, hydrocracking, polymerization, hydrodesulfurization and dehydrogenation, for example, wherein such hydrocarbon conversion processes are carried out in a non-fluidized catalyst bed reactor, which includes fixed bed reactors and moving bed reactors. This invention is particularly advantageous with hydrodesulfurization, hydrocracking, hydrogenation and reforming processes. A particularly preferred application of this invention is with reforming and hydrogenation processes. The various process conditions of temperature, pressure and space velocity vary according to the process and such conditions include those well known to those skilled in the above-mentioned processes.

An additional advantage of increased bulk density of loaded catalyst is that catalyst life may be extended for the same throughput and severity. This extension of catalyst life is a result of the tangible effect of the increased weight of catalyst in a fixed reactor volume as well as the less tangible effect of uniform gas, liquid or gas-liquid distribution which coincides with the more uniform voltage of a densely-loaded catalyst bed. Longer catalyst life results in a longer unit run length.

Furthermore, dense loading of all reactors in an integrated refinery would provide a means for predicting, controlling and optimizing the occurrence of turnaround, based on the premise that catalyst life in each reactor of the refinery network would become a predictable function of tangible factors such as catalyst properties, throughput and operating severity. Intangible effects associated with maldistribution, settling and hotspots would be minimized by dense catalyst loading.

In a particularly preferred embodiment, the utilization of this particle dispensing apparatus provides for an improved reforming process wherein a reforming catalyst is charged to a reactor with the apparatus of the present invention; then hydrogen and a dehydrogenatable organic material, for example, a petroleum hydrocarbon, are contacted with the reforming catalyst and a reformed organic material is recovered. Thus, the reforming process provides for allowing more throughput at the same severity for a given reactor vessel and for greater catalyst weight per volume of reactor vessel. The increase in catalyst bulk density, therefore, allows for the construction and use of smaller and less expensive reactor vessels for a given throughput.

The apparatus of the present invention is used in one embodiment to charge catalyst particles to a reactor vessel in a downflow relationship to the reactor vessel. In general, reactor vessel sizes varying between about 1 to about 16 feet, preferably from about 2 to about 13 feet in diameter, and from about 5 to about 125 feet, more preferably from about 10 to about 75 feet in length can be charged. The rate of fill of the reactor vessel can be non-uniform. However, it is preferred that the rate of fill be uniform and that after a given rate of fill is established, this rate of fill be maintained while preparing the catalyst bed. The catalyst particles are introduced into the reactor vessel at a point such that the distance to the catalyst surface formed as the catalyst particles are introduced through a gaseous medium provides an average free fall distance of catalyst particles of at least about 1 foot, more preferably an average free fall distance from about 5 to about 125 feet and still more preferably from about 10 to about 70 feet. The gaseous medium in general is air or, depending on the catalyst, an inert medium such as nitrogen. Thus, in general, the catalyst particles fall individually to the catalyst surface as the catalyst bed is formed. The catalyst particles are distributed over the surface area of the catalyst bed as it is formed such that the catalyst surface raises at a substantially uniform rate. The catalyst particles are distributed in order to produce a substantially flat catalyst surface defined as a difference between the highest portion of the catalyst surface and the lowest portion of the catalyst surface which is less than 10 percent of the diameter of the catalyst bed, more preferably less than 5 percent and still more preferably less than 1 percent. One of the most commonly used configurations utilized as vessels or reactors is the vertical cylinder with a circular, horizontal cross-section. It is also contemplated that vessels having a horizontal cross-section other than circular may also be loaded with the apparatus of the present invention, However, the apparatus of the present invention is highly suitable for loading particulate matter into a circular vessel.

The term "rate of fill" implies the rise in bed height and may be expressed with units of feet per hour (ft/hr). Another term, particle flux, is convenient to characterize the features of the loading speed and is defined as the pounds of catalyst particles dropped on an area of one square foot in one hour (lb/ft²hr). It has been found that there is a certain particle flux most favorable for optimal loading of a given catalyst. Particle flux and rate of fill are related by the catalyst loaded bulk density:

$$\frac{\text{Flux}, \frac{\text{lb}}{\text{ft}^2 - \text{hr}}}{\text{Loaded } ABD, \frac{\text{lb}}{\text{ft}^3}} = \text{Rate of Fill, ft}^2/\text{hr}$$

It is preferable that a flux between 100 and 1500 lb/hr-ft² is used for increasing the catalyst loaded bulk density, and that more preferable results are obtained for most catalysts using a flux between 300 and 1000 lb/hr-ft².

The above rates of fill, free fall distance, and uniform distribution of the catalyst within the above preferred ranges are preferred since they provide for approaching substantially the maximum bulk density achievable for a given catalyst bed. The reactor vessel sizes which are preferred are those reactors which, in general, are utilized in commercial processes such as hydrogenation, reforming and hydrocracking.

This invention is applicable to catalyst particles which are spheres, pills, extrudates, crystals and cylinders, for example. In general, the particle diameter should not be greater than 3% of the bed diameter and, preferably with a diameter from about $\frac{1}{64}$ to about $\frac{1}{2}$ of an inch, more preferably from about $\frac{1}{16}$ to about $\frac{1}{4}$ of an inch. Catalyst particle diameter refers to the nominal particle dimension in the case where the particle is not spherical.

A wide variety of solid catalysts may be charged to catalytic reaction zones with the apparatus of the present invention such as oxidation, hydrodesulfurization, hydrocracking, reforming and hydrogenation catalysts. The composition, preparation and other characteristics of such catalysts are well known to those skilled in the art of catalysis.

Commercial separation zone vessels are also suitably loaded with adsorbent particulates in a manner utilizing the dispensing apparatus of the present invention. Commercial separation zone vessels vary in width or diameter from about 1 foot to about 15 feet or more, and have lengths from about 5 feet to about 70 feet or more.

The apparatus of the present invention is preferably located in an upper locus of the vessel to be loaded with particulate matter and, of course, has an overall diameter less than the vessel to be loaded. The particle outlets or rotor apertures preferably have a total length as measured in a radial direction in the range from about 2% to about 50% of the diameter of the particle bed. In addition, the particle outlets or rotor apertures are generally tapered and have an increasing width in an outwardly extending direction. The area of the apertures which is available for flow of the particulate matter is adjustable by rotating the baffle plate around a vertical central axis of the rotor in relation to the apertures. The minimum width of the available and usable rotor apertures is preferably at least about 125% of the nominal diameter of the particles being distributed. The loading apparatus rotor is preferably rotated at a speed sufficient to directly deposit at least some of the particles upon the outer periphery of the resulting bed of particles. In a preferred embodiment, the baffle plate is held in a central position by a shoulder bolt which passes through the central axis of the baffle plate and is fastened by threads to the bottom of the rotor. In addition, the baffle plate is also held in position after suitable adjustment by one or more rotor clamps which are attached to the bottom of the rotor. In a preferred embodiment, the rotor clamp is drilled and tapped to hold an adjustment screw which may be advanced to clamp the baffle plate to the bottom of the rotor to prevent the rotation of the baffle plate with respect to the rotor during the loading of the particulate matter. This rotor aperture control mechanism permits a simple one step adjustment whereby the baffle plate masks the rotor aperture so as to control the flow of particulate matter at different locations along the aperture. The baffle plates are sized so that different plates are matched to different sizes of particulate matter. Then the set-up of the rotor is simply a matter of installing the appropriate baffle plate. The apparatus of the present invention ensures that each aperture opening will be identical which is critical since even a slight variation in the different apertures can have a dramatic difference in the levelness of the loaded particle bed. This simultaneous adjustment of multiple aperture openings is an advantageous benefit enjoyed by the present invention. This strict control of the aperture dimensions, both length and width, provides for a simpler and faster loading process as well as a more level particle bed thereby resulting in a more dense, uniform bed.

It is desirable to minimize the loading rate such that the hopper of the particle loading machine remains nearly full at all times which allows the rotor to operate as designed, instead of an on-again, off-again mode where particles may be selectively diverted into one region of the rotor, and preferentially loaded into one region of the vessel. The reason that transient loading rates should be avoided is that constant variation in loading rate causes deviation from optimal flows which leads to bed profile irregularity. The slot control of the present invention allows for fast and easy adjustment of loading rate so that adjustments are more likely to take place in commercial use settings where work stoppage is generally viewed as undesirable. Adjustment is a matter of loosening the set screws in the rotor clamps, rotating the baffle plate in relation to the rotor to achieve a larger or smaller aperture and re-tightening the set screws. Careful, synchronized adjustment of aperture openings in cramped reactor spaces is very difficult to accomplish so the accuracy of the aperture dimensions is vastly improved by the simplified rotor aperture control of the present invention. As the particle loading rate is adjusted to match the available particle lifting capacity, the baffle plate adjustment provides the proper aperture shape that yields a flat particle bed profile.

Referring now to FIG. 1, particle dispensing apparatus 4 is shown located and suspended in an upper locus of vessel 1. Particulate matter inlet conduit 2 supplies particulate matter to particle dispensing apparatus 4 which dispenses particulate matter to bed 3.

Referring to FIG. 2, particle dispensing apparatus 4 has a generally vertically oriented particle container 5 which receives and stores particulate material before it is dispensed. Particulate matter is loaded into the top of particulate container 5 and flows downwardly into rotor 6 which is in communication with particle container 5. The particulate matter is transported through rotor 6 and is introduced into rotor arms 7 which are in open communication with rotor 6. The particulate matter flows from a lower portion of rotor arms 7 through rotor apertures (not shown). A motor 13 is attached to and supported by motor support 16 which, in turn, is attached to and supported by particle container 5. Motor 13 mounted on motor support 16 rotatably turns drive shaft 14 which is attached to rotor support 15. Rotor support 15 is attached to and supports rotor 6. As drive shaft 14 rotates in unison with rotor support 15 and rotor 6, downwardly flowing particulate matter is dispensed via rotor arms 7.

Referring now to FIG. 3, rotor 6 is supported and rotated by means not shown and receives flowing particulate matter through the top opening and flows in a generally horizontal direction through rotor arms 7. Rotor clamps 10 are utilized to immobilize a baffle plate 9 (not shown). Rotor pivot hole 12 is centrally located in the vertical axis of rotor 6 to serve as a positioning and pivoting means for baffle plate 9.

Referring to FIG. 4 which is a plan view of rotor 6 which has equally spaced outwardly disposed rotor arms 7. Each rotor arm 7 has a rotor aperture 8 which communicates with the interior of rotor arm 7 for passage of particulate matter and a rotor clamp which is utilized to adjustably fasten a baffle plate 9 (not shown) to rotor 6 in order to adjustably mask rotor aperture 8. Rotor pivot hole 12 serves to position baffle plate 9 during rotation thereof with respect to rotor 6 when rotor clamps 10 are released.

FIG. 5 is a plan view of baffle plate 9 which has equally spaced baffle plate leaves 18. A baffle plate pivot hole 17 is positioned at a central location of baffle plate 9. Each baffle plate leaf 18 is positioned to mask at least a portion of rotor aperture 8 and is releasably clamped into a fixed position by rotor clamp 10. In order to rotatably position baffle plate 9 with respect to rotor 6, rotor pivot hole 12 is pivotably located in direct alignment with baffle plate pivot hole 17.

The foregoing description and figures clearly illustrate the advantage encompassed by the loading apparatus of the present invention and the benefits to be afforded with the use thereof.

What is claimed:

1. An apparatus for dispensing particulate material onto a particle bed within a vessel, said apparatus comprising:

(a) a particle container defining a container opening at an upper portion for receiving particulate material into an upwardly directed end and defining a container outlet in a lower portion for discharging particulate material;

(b) a rotor rotatably positioned adjacent to the container outlet and defining an upper opening for receiving particulate material from said particle container, said rotor having multiple elongated, hollow arms and said multiple arms each defining at least one aperture in a lower portion thereof for discharging particulate material;

(c) a baffle plate having multiple extended leaves joined about a common pivot point and positioned for partial occlusion of the apertures by relative rotation of said baffle plate relative to the rotor;

(d) a fastener for adjustably securing said baffle plate to said rotor; and (e) a means for rotating said rotor in communication with said particle container.

2. The apparatus of claim 1 wherein said particle container is cylindrical.

3. The apparatus of claim 1 wherein said rotor comprises four elongated hollow arms.

4. The apparatus of claim 1 wherein said apertures are positioned in a generally horizontal surface of the rotor.

5. The apparatus of claim 1 wherein said apertures are tapered and increase in size towards the outward ends of the arms.

6. The apparatus of claim 1 wherein said baffle plate comprises four elongated leaves.

7. The apparatus of claim 1 wherein the means for rotating the rotor comprises a motor.

8. The apparatus of claim 7 wherein the means for rotating the rotor comprises a pneumatic motor.

9. The apparatus of claim 1 wherein said baffle plate is rotatably positioned around a vertical central axis of the rotor.

10. The apparatus of claim 1 wherein said leaves are positioned against the underside of said arms.

11. A method for loading particulate material into a vessel and distributing the particulate material at substantially the same rate, uniformly across the area of the vessel by means of a dispensing apparatus comprising:

(a) introducing the particulate material into a particle container of the dispensing apparatus through an inlet opening at an upwardly directed end;

(b) flowing particulate material from an outlet end of the particle container through an outlet opening into a particle feed opening of a rotor having multiple elongated, hollow arms;

(c) passing particulate material through the hollow interior of the multiple arms and through at least one aperture located in a lower portion of each arm to discharge and distribute particulate material as the rotor rotates relative to the particle container; and (d) controlling the flow of particulate material from the multiple arms by unitary pivotal positioning of a baffle plate and multiple elongated leaves attached thereto relative to the rotor and selective engagement of a fastener that fixes the leaves in variable occluding positions with respect to each of the apertures of the rotor.

* * * * *